(12) United States Patent
Voynov et al.

(10) Patent No.: US 11,606,475 B2
(45) Date of Patent: Mar. 14, 2023

(54) METHOD FOR MARKING VISUALS OF INFORMATION FOR SUBSEQUENT IDENTIFICATION OR AUTHENTICATION

(71) Applicant: G-71 Inc., Brooklyn, NY (US)

(72) Inventors: Sergey Voynov, Moscow (RU); Alexander Korznikov, Moscow reg (RU); Sergei Timoshenko, Moscow (RU)

(73) Assignee: G-71 Inc., Mountain View, CA (US)

( * ) Notice: Subject to any disclaimer, the term of this patent is extended or adjusted under 35 U.S.C. 154(b) by 38 days.

(21) Appl. No.: 17/403,127

(22) Filed: Aug. 16, 2021

(65) Prior Publication Data
US 2021/0377419 A1 Dec. 2, 2021

Related U.S. Application Data

(63) Continuation-in-part of application No. 16/892,892, filed on Jun. 4, 2020, now Pat. No. 11,120,520.

(60) Provisional application No. 62/858,086, filed on Jun. 6, 2019.

(51) Int. Cl.
*H04N 1/32* (2006.01)
*G06V 10/75* (2022.01)

(52) U.S. Cl.
CPC ....... *H04N 1/32219* (2013.01); *G06V 10/751* (2022.01)

(58) Field of Classification Search
CPC ........... H04N 1/32219; H04N 1/32229; G06V 10/751; G06F 21/16; G06F 21/64; G06T 2201/0061; G06T 2201/0051; G06T 2201/0062; G06T 2201/0081; G06T 1/0028; G06T 1/005
See application file for complete search history.

(56) References Cited

U.S. PATENT DOCUMENTS

| 7,555,650 B1 | 6/2009 | Zhao et al. |
| 2007/0014429 A1* | 1/2007 | He .................. H04L 9/3236 382/100 |
| 2007/0033528 A1 | 2/2007 | Merril et al. |

(Continued)

OTHER PUBLICATIONS

Harran et al. "A method for verifying integrity & authenticating digital media." In: Applied-computing and informatics. May 31, 2017 (May 31, 2017) Retrieved on Jul. 27, 2020 (Jul. 27, 2020) from <https:l/reader.elsevier.com/reader/sd/pii/82210832717300753?token= DA558654B804EC9793A8DD2C1A6F6CD7F6COD31E686D644 87332FEF171B99ECOC156E93D1FCE66A782F128534763 B3A9>.

(Continued)

*Primary Examiner* — Christopher Wait
(74) *Attorney, Agent, or Firm* — St. Onge Steward Johnston & Reens LLC

(57) ABSTRACT

A method for authenticating digital information includes obtaining, in digital form, information for authentication; preparing the information for processing, such preparation including converting the information into a digital image; identifying segments of content in the digital image; grouping the segments of content into one or more segment groups; generating a marking sequence comprising shifting at least one of the one or more segment groups in one or more directions; and applying the marking sequence to the digital image, creating a unique marked copy of the digital image.

16 Claims, 13 Drawing Sheets
(6 of 13 Drawing Sheet(s) Filed in Color)

(56) References Cited

U.S. PATENT DOCUMENTS

2015/0026162 A1    1/2015   King et al.
2015/0302266 A1   10/2015   Boncyk et al.

OTHER PUBLICATIONS

Written Opinion and International Search Report for PCT/US2020/036344 dated Aug. 18, 2020 (9 pages).
Kee et al. "Digital image authentication from JPEG headers." In: IEEE transactions on information forensics and security. Mar. 17, 2011 (Mar. 17, 2011) Retrieved on Jul. 27, 2020 (Jul. 27, 2020) from <http://kimojohnson.com/publications/jpeg/tifs11_a.pdf>.

* cited by examiner

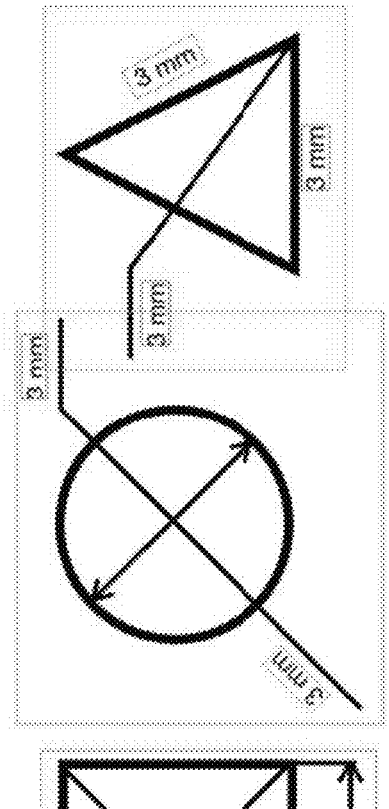
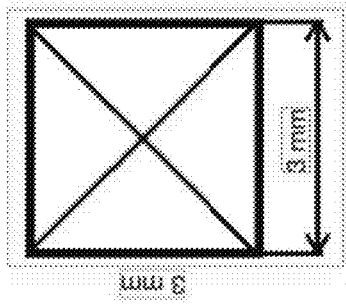
FIG 4

Cxl (a b c d e f)

TM (a b c d e f)

Nulla vestibulum commodo sem ac tristique.

Pellentesque lacinia turpis nec ornare faucibus.

Proin neque diam, convallis id metus at, condimentum ullamcorper elit. Maecenas fermentum aliquet est vel maximus. Duis in dapibus risus. In venenatis posuere auctor.

Pellentesque in tempus lectus. Donec at lacus venenatis, finibus est non, mattis eros.

FIG. 10

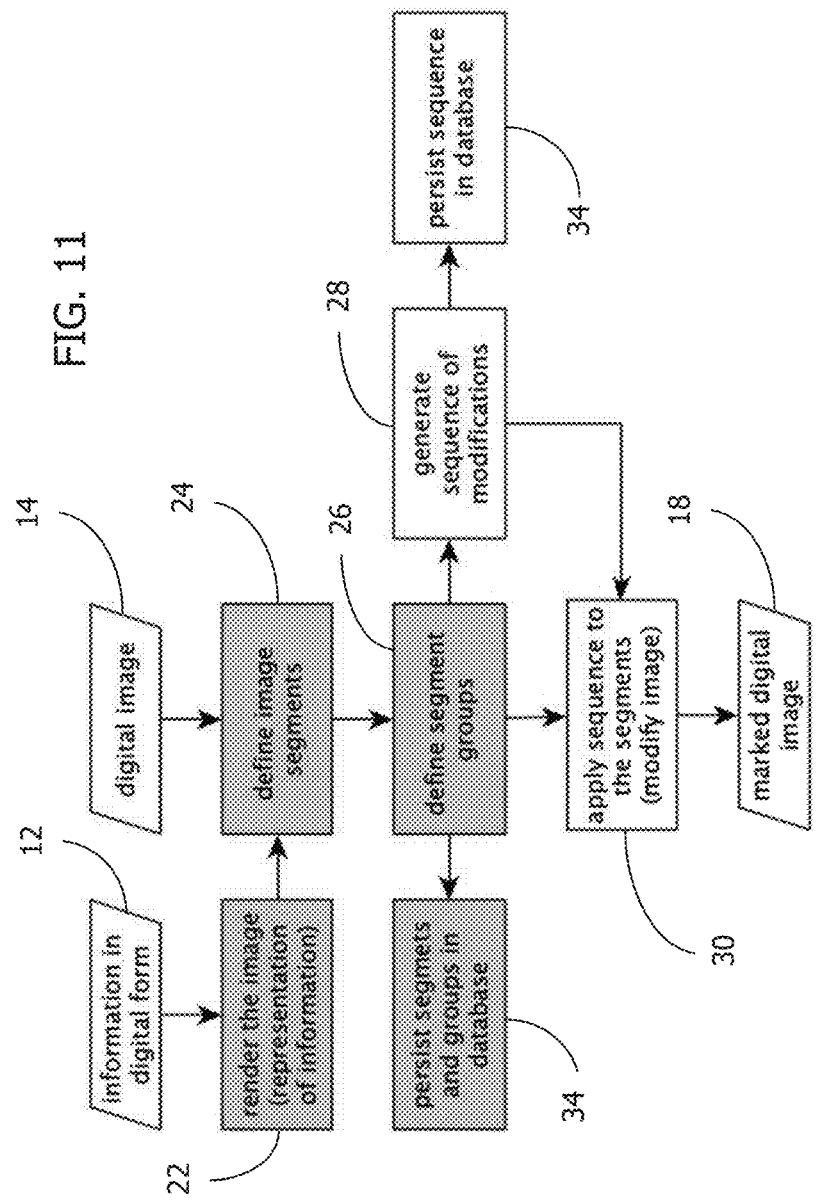

METHOD FOR MARKING VISUALS OF INFORMATION FOR SUBSEQUENT IDENTIFICATION OR AUTHENTICATION

FIELD OF THE INVENTION

The invention is related to the field of information visuals (visual images) marking for their subsequent identification or authentication (establishing the fact of authenticity) that can be used for images protection from unauthorized disclosure (identification) or for prevention of fraud/establishing the fact of authenticity (authentication).

BACKGROUND OF THE INVENTION

The problem of information protection from its unauthorized disclosure is one of the most important in many commercial or state organizations. Unauthorized disclosure of information can lead to substantial losses, both reputational and financial (lawsuits, loss of customers and partners, loss of market share, reduction in the value of the company, etc.).

In the modern world, information in organizations exists in digital form and its spread is controlled by various technical means (for example, Data Loss/Leaks Prevention class DLP information systems or Information Rights Management (IRM)). Development and spread of digital information control systems allows to control and prevent movement of information beyond a certain perimeter of information security. However, a person uses vision to get information in most cases, and it means that transmission of information from a digital form to a person is almost always possible through visualization of information in the form of an image on a screen or paper, how it happens now. However, as soon as the information is displayed on the screen or displayed on a printing device, it becomes impossible to control it. Modern development of portable digital devices (smartphones, digital cameras and video cameras and others) has led to the fact, that it is exactly these means that become a tool to steal information. In conditions when more and more companies adhere to the concept of BYOD (Bring Your Own Device), it is almost impossible to deprive employees of smartphones. Also, it is impossible to control or prohibit the removal of printed images from the company.

In such a way, photographing the information displayed on a screen or on paper on a smartphone's camera, as well as the theft of information on paper, remains the most accessible and, subsequently, the most common way of information theft, and this trend will only get worse in the future.

The problem of information authentication is also acute due to modern possibilities from the side of mass media or social networks in the part of manipulating public opinion. If an image is given in one or another article (for example, a document), the reader is practically unable to verify the authenticity of this image. If the information is given in full view (for example, an entire document), then ways to authenticate this information exist, for example, using an EDS (electronic digital signature), but you must have on the side of the information source (company) a certain catalog of information with electronic signatures and an available (for the verifier) certifying authority, however, this loses the ability to authenticate the information on the fragment. The given method of marking the image allows in some cases to check for authenticity including a fragment (part) of the full image.

There are existing solutions (inventions/methods) of special labeling of documents, while considering various approaches:

Using special marks (for example barcode, or classified mark);
Using special ink;
Using unobtrusive marks (points in certain places);
Use special paper.

All the methods described above have a number of disadvantages, in particular, the use of special ink or paper allows you to authenticate the document, but the data will be lost when photocopying or photographing the document.

The use of special unobtrusive labels also does not allow to save them, especially with repeated photocopying. The use of visible marks allows you to exclude them, thereby hiding data on a particular document.

The proposed method differs from the listed several advantages:

Hidden markings are preserved when photocopying and photographing, while not sensitive to quality.

Markings cannot be removed without deleting basic information.

There are ways to covertly label documents by changing the line spacing and the length of the spaces. These methods are closest to us, but they have a significant limitation: they apply only to text.

The proposed method is devoid of this disadvantage and can be applied to any visualized information (on the screen or paper), while retaining all the advantages. The proposed method does not rely on words in a document, but operates with parts of an image combined into groups. Visualized information can be understood as a regular document, as well as a diagram or a drawing, a table or presentation, a web interface or a native GUI, etc.

SUMMARY OF THE INVENTION

The given invention helps to provide image protection from unauthorized spread, identification of distribution channels (persons involved in distribution), as well as can be used to confirm the authenticity of the image.

The image in the framework of this invention means any graphic image (digital on the screen or displayed on a printing device), but the main use scenario of the invention involves marking images of documents (pages), diagrams, drawings, presentations, tables, but the invention is not limited to any particular type of images. Using the method of marking with the above types of images allows to achieve such an advantage as the indistinguishability (invisibility) of marking "by eye" without the use of special technical means.

One exemplary embodiment of the inventive method for authenticating digital information includes obtaining, in digital form, information for authentication; preparing the information for processing, such preparation comprising converting the information into a digital image; identifying segments of content in the digital image; grouping the segments of content into one or more segment groups; generating a marking sequence comprising shifting at least one of the one or more segment groups in one or more directions; and applying the marking sequence to the digital image, creating a unique marked copy of the digital image.

In some embodiments, the marking sequence further includes altering a spacing between two or more of the segments in at least one of the one or more segment groups.

The information for authentication may be obtained via electronic communication from a user. Additional data relating to the user and the user's submission may also be obtained along with the information for authentication. For example, the additional data relating to the user and the user's submission may include identifying information about the user, a date and time of the user's submission, and the user's method of submission. At least one of the marking sequence, the unique marked copy, the digital image, the information for authentication, and the additional data relating to the user and the user's submission may be stored in digital form in a database.

In some embodiments, the method also includes obtaining a digital image for comparison; employing an authentication process to authenticate the digital image for comparison by comparing it to the unique marked copy; and generating an authenticity conclusion report identifying the digital image for comparison as authentic if the authentication process determines that it matches the unique marked copy and identifying it as inauthentic if it does not.

The authentication process may be performed by digitally overlaying the digital image for comparison with the unique marked copy, and the digital image for comparison may be obtained through an internet scraping process. In some cases, both the information for authentication and the image for comparison are each obtained through a user submission. Further, additional data relating to each of the user submissions may be obtained along with the information for authentication and the image for comparison, the additional data comprising identifying information about each user, a date and time of each user submission, and each user's method of submission. At least one of the marking sequence, the unique marked copy, the digital image, the information for authentication, the digital image for comparison, the authenticity conclusion report, and the additional data relating to each of the user submissions is stored in digital form in a database.

Some preferable embodiments of the present invention process PDF and/or other non-raster image files much faster by foregoing the character recognition and object grouping operations of the authentication process. PDF files, for example, often contain internal operators that group text and other objects, which the present invention can utilize to speed up its processing. Marking a PDF file may thus be completed without undertaking the optical character recognition and object grouping steps of the process. Instead, such non-raster image files provide the object grouping and the authentication process is streamlined to simply generate the sequence of modifications and persist it in the database, apply the modifications to the image file, and assemble the marked image file for use.

From a visual perspective, the marking results of the present invention's process on non-raster image-format files, such as PDFs, is identical to those apparent on raster-format files. However, because the process utilizes the non-raster image file's internal character recognition and object grouping operators, the authentication process can be sped up to ten times faster for non-raster image files than that applied to raster-format files. As will be recognized by those of skill in the art, this improved processing time can be vital when processing large amounts of data amongst one or more files.

The objectives of the present invention are further achieved by providing a system for authenticating digital information. One preferable embodiment of such system includes a preliminary analysis module for obtaining and processing the digital information and converting it into a digital image, and an authentication marking module for isolating and grouping segments of content from the digital image and generating and applying a marking sequence to the digital image to create a unique marked copy. The preliminary analysis module obtains the digital information and converts it into a digital image. The authentication marking module identifies segments of content from the digital image and groups the segments of content into one or more segment groups, and generates the marking sequence to shift at least one of the one or more segment groups in one or more directions, creating the unique marked copy of the digital image.

In some embodiments, the marking sequence may also alter a spacing between two or more of the segments in at least one of the one or more segment groups.

The system may further include a comparative analysis module for authenticating a digital image for comparison. The comparative analysis module obtains the digital image for comparison, initiates an authentication process, which includes comparing the digital image for comparison with the unique marked copy of the digital image, and generates an authenticity conclusion report identifying the digital image for comparison as authentic if the authentication process determines that it matches the unique marked copy and identifying it as inauthentic if it does not.

The authentication process may include digitally overlaying the digital image for comparison with the unique marked copy.

The comparative analysis module may obtain the digital image for comparison by employing an internet scraping protocol. Or, the system may obtain both the information for authentication and the digital image for comparison from an independent user submission. Additional data relating to each of the independent user submissions may be obtained along with the information for authentication and the image for comparison, the additional data including identifying information about each user, the date and time of each user submission, and each user's method of submission. In some embodiments, at least one database is also provided, wherein at least one of the marking sequence, the unique marked copy, the digital image, the information for authentication, the digital image for comparison, the authenticity conclusion report, and the additional data relating to each of the user submissions is stored in the at least one database.

In some embodiments of the invention, the system is implemented on a user's device using local installation software. In additional inventive embodiments, the system is implemented over a network connecting a user's device with a remote server.

As those skilled in the art will appreciate, the present invention is not limited to the embodiments and arrangements described above. Other objects of the present invention and its particular features and advantages will become more apparent from consideration of the following drawings and detailed description of the invention.

BRIEF DESCRIPTION OF THE DRAWINGS

The patent or application file contains at least one drawing executed in color. Copies of this parent or patent application publication with color drawing(s) will be provided by the Office upon request and payment of the necessary fee.

FIG. 4 shows examples of combining parts into groups using the example document from FIG. 2.

FIG. 10 shows how the constituent parts of a non-raster image file, such as a PDF, are separately identified and combined into groups.

FIG. 11 is a schematic representation of a method according to the preferable embodiments of the present invention depicted in FIGS. 1-5 and 10, with the shaded boxes representing operations that are unnecessary when processing a non-raster image file, such as a PDF.

DETAILED DESCRIPTION OF THE INVENTION

Figure 1:
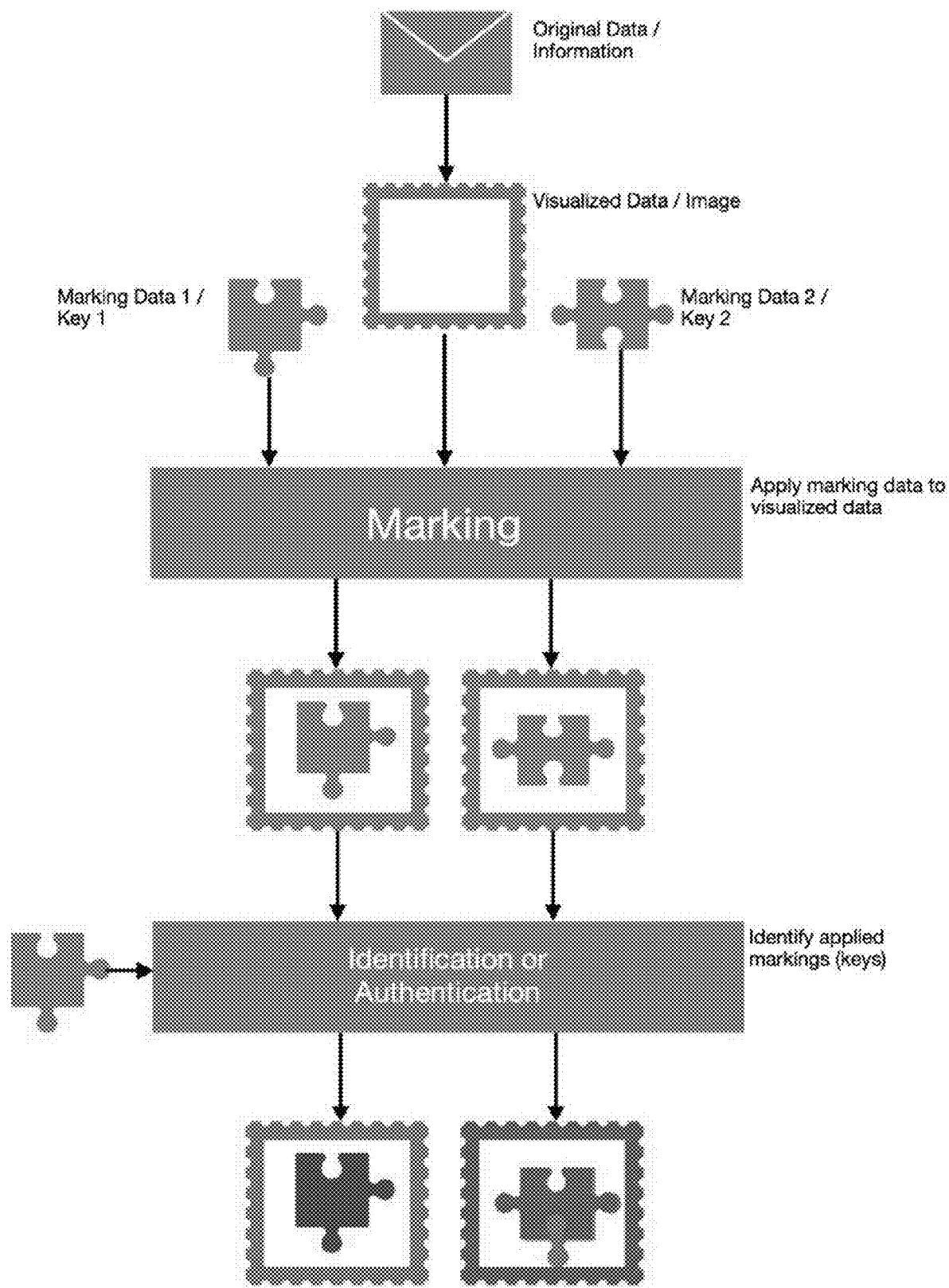
FIG. 1 is a general diagram describing how to mark visual images and identify/authenticate.

The essence of the given method is illustrated by figures, where:

The given method includes the following stages:

Stage 1. Preliminary analysis (analysis and structuring) of the marked information (document, drawing, scheme, etc.)

Stage 2. Marking of the image and the formation of a unique copy (which has unique geometric characteristics of graphic objects), with the registration of marking parameters and information about the recipient of the image (subject) in the journal.

Stage 3. Digital image analysis of a fragment of a marked copy (for example: photograph of the image on the screen or in printed form, scanned copy of the image in printed form, screen shot (screenshot) of the computer) and comparison with the registered marked images with the identification of the corresponding journal log entry.

The present method is carried out using the novel computer software "LeaksID". The software is one of the method realizations, but there can be other ways for realization. The software provides the ability to download (transfer to the program) the user information in digital form (image, document, drawing, diagram, presentation); users receive marked (uniquely) copies of previously downloaded information; download for analysis of a digital image of information in full form or fragment (photographs of a screen or a printed copy, scan-image of a printed copy, etc.); identification marking on the analyzed image and the identification of the corresponding journal log entry.

Despite the fact that the software represents the implementation of the given method in a certain form (in accordance with a specific set of use cases), the method does not exclude and suggests the possibility of a different implementation, also in the form of one or more computer programs, within which the claimed marking method, but use cases will be different (for example: marking of images will occur in a hidden (implicit) way for the user, without his conscious participation, thereby achieving an additional level of security).

Description of the method steps/stages:

Stage 1. Preliminary Information Analysis

At the first Stage, the marked information in digital form is transmitted to the software for analysis and formation of the structure of its visualization. At the same time, the original unmarked information (the original) is stored in a protected storage area, in a format suitable for optimal marking speed (for example, a multi-page scan-image of a document may be divided into separate pages), but not necessarily.

Marked information means any information that can in one way or another be displayed both on a screen and displayed on a printing device (For example: raster or vector format image, document, diagram, chart, drawing, etc.)

The information visualization structure formation is as follows:

Step 1. A visual representation of the original (visual image) in any form (bitmap, raster image, vector image, etc.) is formed in the computer memory. If the information in the visual display consists of several pages, each page is processed in the same way.

Step 2. The visual image is divided into independent related components. For example, for a regular text document, this could be letters, words, signs, lines, etc. In the framework of the given method, an independent component is considered to be, in a general sense, the area of a visual image that can be moved relative to other "unrelated" components without losing the meaning of information or obvious visual defects. Any method can be used to identify components (for example: OCR—Optic Character Recognition). Additional steps for a visual image processing can be performed during this step in order to increase quality of component definition (for example: image binarization performed by any suitable method).

Each component is provided with data for enabling subsequent restoration of its coordinates on a visual image (for example: for raster images, this may be a pair of coordinates (x1, y1; x2, y2) of diagonally opposite angles of the framing rectangle, or coordinates (x, y) of one angle and characteristics of the width and height of the framing rectangle, etc.).

Step 3. Forming of the structure of groups of dependent components. During this Step, all components obtained in Step 2 are connected into dependent structures. The dependent structure in the framework of the present method means a set of components that must be moved along a particular axis of the image in a single direction and a single distance (for example: all characters in one line of the document can only be moved vertically together; or the first words of all lines of a paragraph except the first, can be moved horizontally only together).

The grouping of dependent components can occur in various ways and methods (for example, for the black-and-white image of a document, you can use the graphical spectrum method described in O'Gorman, L. "The document spectrum for page layout analysis" (Volume: 15, Issue: 11) or any other suitable method. In such a way, as a result of this step, a structured representation of the geometric characteristics of the information visual image is obtained, which is stored in the computer memory and is associated with the original (loaded earlier in Step 1).

Stage 2. Marking the Image and Formation of a Unique Copy

Marking of the image takes place in the background (preliminary) or upon request (either from a user and from other programs, in the case of embedding, or both).

At the marking Stage, on the basis of a structured representation of the geometric characteristics of the original image (obtained in Step 1), the original visual image is modified by displacing groups and components along different axes, but preserving the dependencies (determined at the 3rd Step of the 1st Stage).

Examples:

For a scanned image of a plain text document: line i is shifted up by A pixels, line j is shifted down by B pixels, word k in line i is shifted to the right by C pixels, word n in line j is shifted by D pixels, etc.

For a diagram or chart: all blocks of the i-th group are shifted to the right by X points and down by Y points.

For a word document: for paragraph i, increase the line spacing by 0.1 points, j the gap of paragraph k, increase by 50% in proportions, add s spaces before the t-th word in m paragraph, etc.

Additional Examples:

1) For a scanned image of a regular text document: line L1 is shifted up by Y1 pixels, line L2 is shifted down by Y2 pixels, word W1 in line L3 is shifted to the right by X1 pixels, word W2 in the line L4 is shifted to the left by X2 pixels, etc.
2) For a chart or diagram: all blocks of the group G1 are shifted to the right by X5 points and down by Y5 points.
3) or a word document: for paragraph P1, line spacing should be increased by 0.1 points, S1 space of paragraph P2 should be increased in proportions by 50%, before the W1 word in P3 paragraph, add S2 spaces, etc.

The present method does not limit methods of changing the geometric characteristics of the visual image. The above examples are intended only to clarify the purpose and method of marking.

Thus, by making certain changes in the visual image of the original, a copy is produced that has different geometric characteristics from the original.

To achieve uniqueness, before making changes in the framework of the implemented program, a pseudo-random sequence of offsets (direction and distance) is generated, which is subsequently applied to the visual image of the original and allows one to get a unique random copy. At the same time, the parameters of the displacements, depending on the settings and the field of application, are selected so that the person without the use of special technical means and/or without a long analysis will not be able to determine what changes were made to the visual image of the original.

In such a way, a unique copy of the visual image is produced, without making any additional characters or marks (as opposed to other methods) that a person could discover and omit (for example, cut out).

The use of original transformations based on a specific sequence (not random) allows one to add additional "implicit" information to the original, a so-called shorthand method (for example: coding of bit information through single and double spaces in the document, or single and one and a half line spacing, etc.). In this case, such additional information can be read from the document by a machine. Based on this "additional" information, it is possible to authenticate documents without even having access to a complete document, but with only a portion of the document.

The amount of possible information is directly proportional to the number of blocks on the visual image of the original.

Within the framework of the given program, the sequence on the basis of which the original was marked (by displacing blocks and groups) is stored in a protected storage area and is uniquely associated with the transaction log, in which facts, time and subject that requested the marked image of information are recorded.

Stage 3. Digital Image Analysis of a Fragment of a Marked Copy

To analyze and identify a marked copy, the program that implements the present method loads the analyzed visual image, i.e. "sample" (for example, a screen picture or a scan image created from a paper document).

Then a process of image structuring takes place (similar to the Step 2 in the Stage 1).

The original information previously downloaded into the program is then selected (the selection can be made by the user or the program itself on the basis of various methods, for example, using full-text search).

Next, a process of "calibration", i.e. comparisons of various components between the analyzed sample and the original previously loaded into the program, takes place. This process can occur automatically or with the help of a user.

Then, all previously created marked copies are reproduced, based on the log and sequences stored at the Stage 2, and are compared with the loaded sample.

Comparison can take place in various ways, including by overlaying a sample on a previously reproduced copy, in which case the degree of similarity can be calculated by counting overlapping parts of the image (for example: the number of matched pixels for bitmaps).

Before performing the comparison, the sample and the recreated copy can be processed in various ways (for example, binarized).

As a result of comparing the sample with all previously recreated copies and calculating the degree of similarity, it is possible to count and sort the obtained results to identify the corresponding analyzed sample of the marked copy and the associated log entry.

After the process of structuring an image of a sample, by simple mathematical and statistical operations, it is possible to obtain with a certain degree of error additional information, which was implicitly encoded by steganography into the original visual image.

Obtaining information directly from the sample allows to apply this information both to identify the marked copy and for authentication.

Referring now to the figures, FIG. 1 depicts a schematic representation of the steps of an exemplary embodiment of the presently invented authentication process. The original data or information 12 is obtained through digital means, preferably from a user uploading the original data or information 12. The original data or information 12 may then be converted to a format depicting its content as a digital image 14, such as a pdf, jpeg, gif, tiff, or other similar file type, as will be known to those of ordinary skill in the art. The present invention then generates one or more marking sequences 16 and applies them to the digital image 14, creating one or more unique marked copies 18 of the digital image.

The system preferably stores the original data or information 12, the unmarked digital image 14, the one or more marking sequences 16, and the one or more unique marked copies 18 in a database or similar digital data storage structure and preferably associates the stored information with identifying information about the user that submitted the original data or information 12 and the circumstances surrounding that submission, such as a date/time stamp, method of submission, etc. The present invention may then compare a subsequently obtained digital image with the stored marking sequences 16 using an authentication process 20 to determine if the subsequently obtained digital image is an authentic copy and, preferably, identify the user that initiated the matching marking sequence 16 to determine if the subsequently obtained digital image is an authorized copy, if the source of the subsequently obtained digital image is associated with said user, etc.

Preferable embodiments of the authentication process 20 include overlaying the subsequently obtained digital image using the one or more unique marked copies 18. The authentication process 20 may be employed using only a fragment of the subsequently obtained digital image or may compare the entire subsequently obtained digital image to only a fragment of the one or more unique marked copies 18. Those of ordinary skill in the art will recognize the various available means of authentication of the subsequently obtained digital image.

Figure 2:
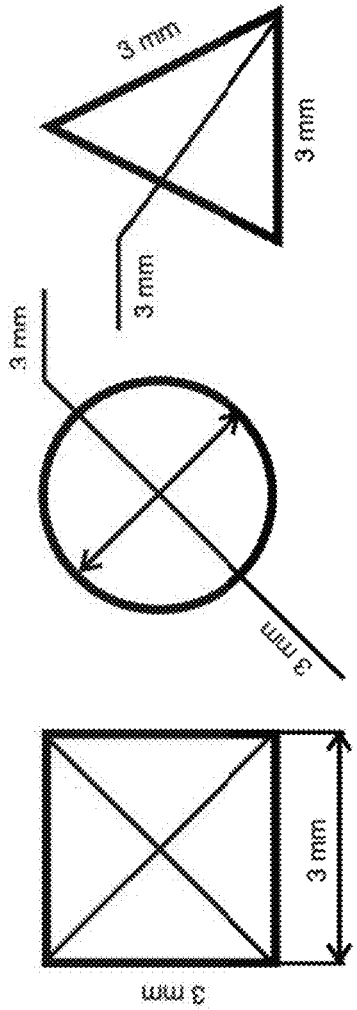
FIG. 2 is a sample document to demonstrate the method.

FIG. 2 depicts an exemplary digital image 14 demonstrating the application of the present technology. The digital image 14 depicted in FIG. 2 contains text, a table, and several shapes. Each of these objects in the digital image may be isolated, fragmented, and grouped in various ways in preparation for the authentication process of the present invention.

Figure 3:
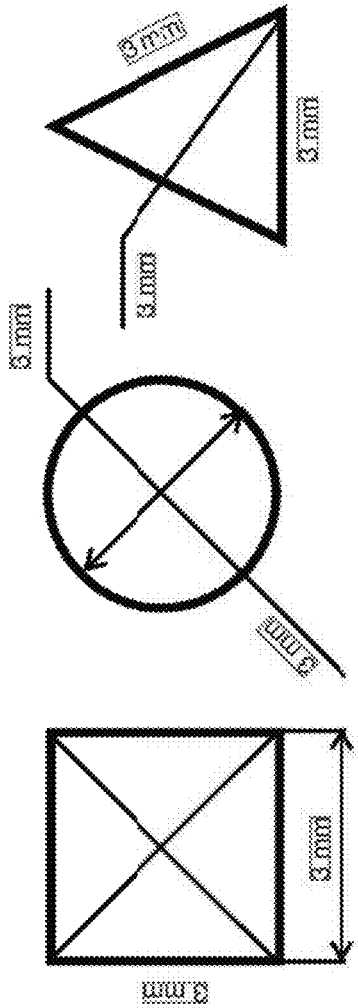
FIG. 3 shows how the visual image is separated (split) into its constituent parts by the example of the document from FIG. 2.

FIG. 3 depicts the same exemplary digital image 14 as depicted in FIG. 2. However, in FIG. 3, each text object has been isolated and identified. The various text objects may now be grouped in various ways with each other and with the other table and shape objects in the digital image.

FIG. 4 again depicts the same exemplary digital image 14 as depicted in FIGS. 2 and 3. In FIG. 4, each of the table and shape objects have likewise been isolated and identified. FIG. 4 also depicts the grouping of the various objects, represented by the colored boxes surrounding each object. Once grouped as depicted, the present invention can apply the marking sequence 16, shifting one or more groups in a predetermined direction, indistinguishable upon visible inspection of the resulting unique marked copy 18 of the digital image but plainly recognizable using the overlay procedure of the present invention's authentication process 20.

Figure 5:
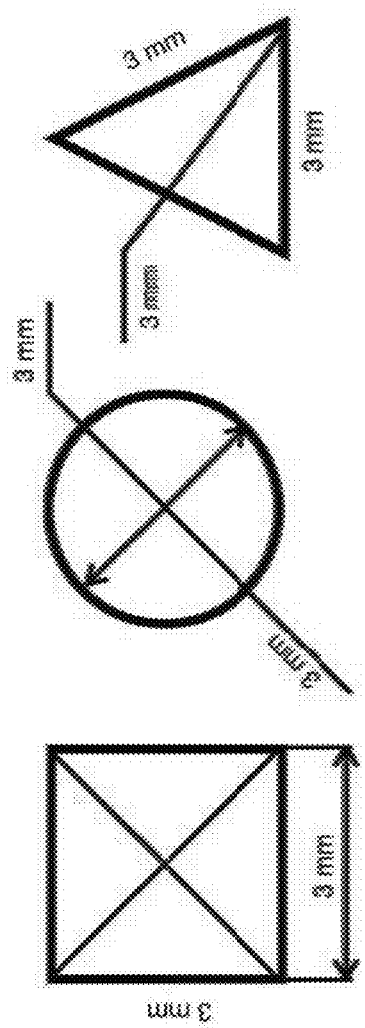
FIG. 5 demonstrates how the labeled copies of the document from FIG. 2 are distinguished through the coloring of copies (the red copy is superimposed on the blue copy).

FIG. 5 depicts an exemplary unique marked copy 18 overlayed upon the exemplary digital image 14 depicted in FIGS. 2-4. As shown, the slight shift of certain groups of objects in the unique marked copy 18 become plainly visible upon performing the overlay comparison authentication process 20, although the same shift would be practically unrecognizable upon visual inspection of the unique marked copy on its own.

Figure 6:
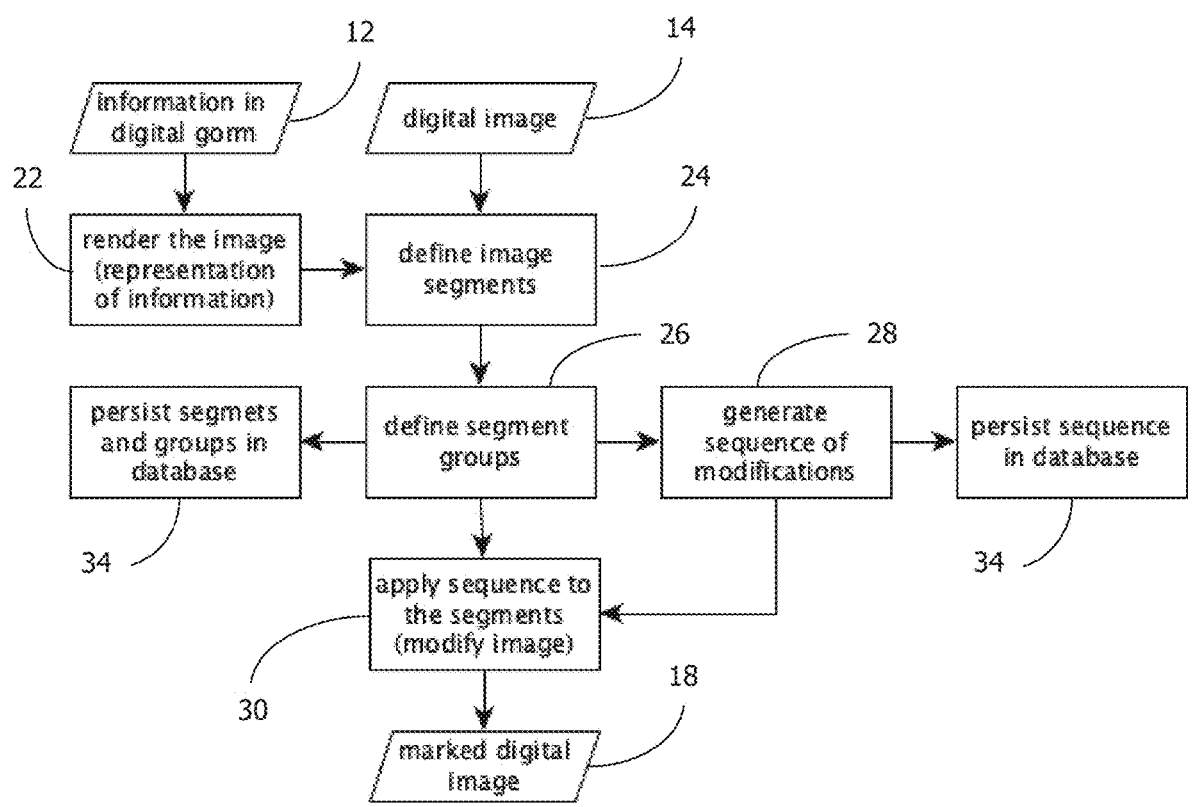
FIG. 6 is a schematic representation of a method according to the preferable embodiments of the present invention depicted in FIGS. 1-5.

Referring now to FIG. 6, an exemplary method according to preferable embodiments of the present invention is depicted schematically. As shown, the process begins by obtaining a digital image 14 or by obtaining original data or information 12 in digital form and converting the original data or information 12 into a digital image 14 through the step of rendering the image 22. The digital image 14 is analyzed to define image segments or fragments 24, and the segments or fragments are then organized into segment groups 26. The present invention next generates a marking sequence of modifications 28 and applies the sequence to the image segment groups, modifying the image 30. In preferable embodiments, a unique marked copy 18 of the digital image 14 is created, rather than marking the original digital image 14. Preferable embodiments of the present invention also store the digital image in a database 34 at various points in the process as well as the marking sequence for later reference.

Figure 7:
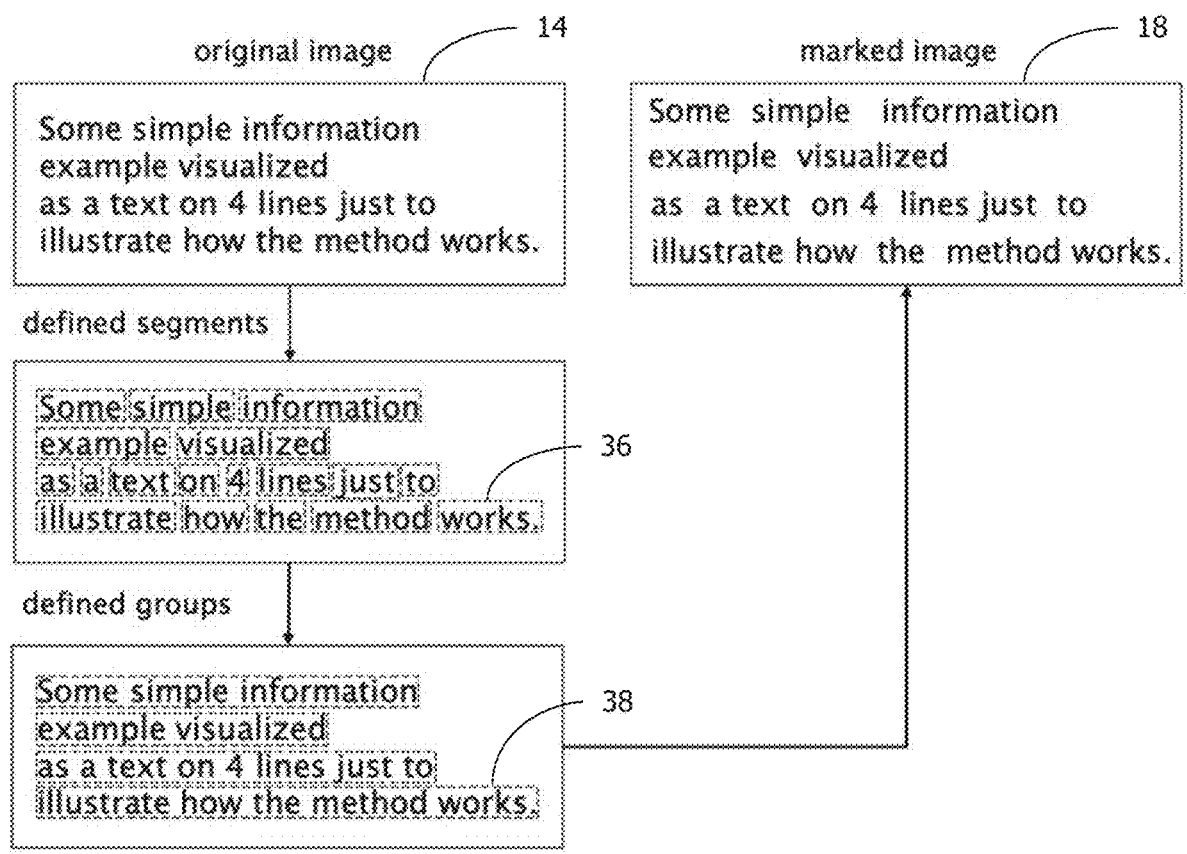
FIG. 7 is a schematic representation of an application of the method according to preferable embodiments of the present invention depicted in FIG. 6.

Referring next to FIG. 7, an exemplary application of the preferable embodiment of the method depicted schematically in FIG. 6 is depicted, also schematically. As shown, the original digital image 14 is first analyzed to identify image segments or fragments 36, depicted in dashed-line boxes. Those segments or fragments 36 are then organized into segment groups 38. In the exemplary application depicted in FIG. 7, the segment groups 38 are defined line by line, again depicted in dashed-line boxes. Finally, the segment groups 38 are altered according to the marking sequence, resulting in a unique marked image 18. In the exemplary application depicted in FIG. 7, the segment groups 38 are shifted vertically relative to one another, and the spacing between the segments or fragments 36 within each segment group 38 has been altered.

Figure 8:
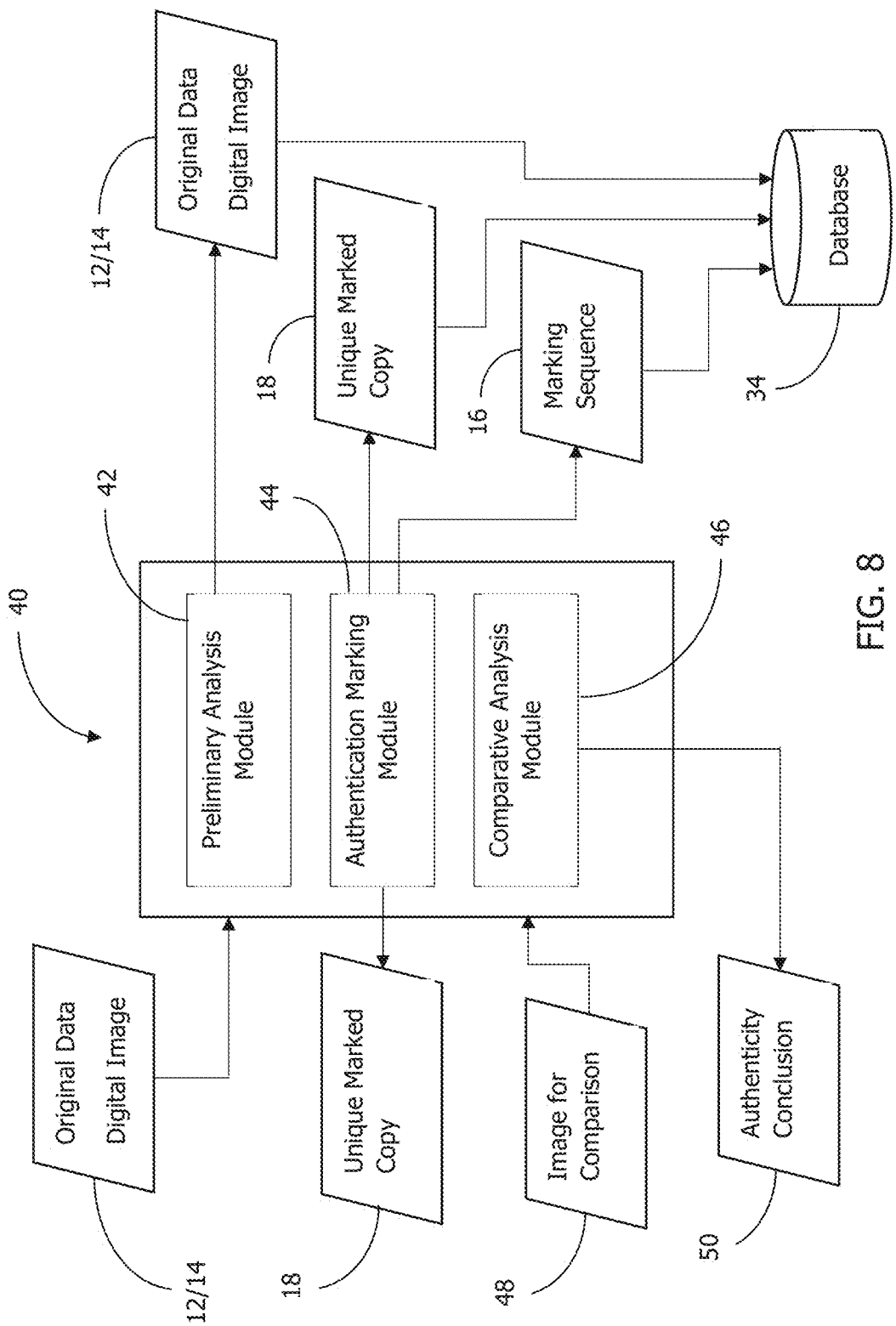
FIG. 8 is a schematic representation of a system according to preferable embodiments of the present invention depicted in FIGS. 1-7.

FIG. 8 depicts a schematic representation of an exemplary system 40 according to preferable embodiments of the present invention. The exemplary system 40 depicted in FIG. 8 can implement and execute the exemplary processes and methods depicted in FIGS. 1-7. Preferable embodiments of system 40 include a preliminary analysis module 42, an authentication marking module 44, and a comparative analysis module 46. The preliminary analysis module 42 obtains the original data or information 12 for processing. If the original data or information 12 is obtained from a user, preferable embodiments of the preliminary analysis module 42 also obtain information about the user and the circumstances surrounding the user's submission and request, such as a date/time, method of submission, etc. Those of ordinary skill in the art will recognize the various ways of obtaining such information from the user, who may also volunteer such information.

Upon receipt, the preliminary analysis module 42 determines if the original data or information 12 is in an appropriate digital image 14 format. If not, the preliminary analysis module converts the original data or information 12 into an appropriate digital image format 14. The preliminary analysis module 42 then preferably stores the original data or information 12, the original digital image 14, and/or the information relating to the user and the user's submission in a database 34 for later reference and creates a copy of the original digital image 14 for processing.

The system 40 next analyzes the digital image 14 copy and identifies the various segments or fragments 36 found therein. This step may be performed by either the preliminary analysis module 42, the authentication marking module 44, or the two in combination. For example, the preliminary analysis module 42 may perform an optical character recognition (OCR) process on the digital image 14 copy, and the authentication marking module 44 may then isolate and identify the various segments or fragments 36 in the document. Or, either the preliminary analysis module 42 or the authentication marking module 44 may do both.

In any case, once the segments or fragments 36 are isolated and identified, the authentication marking module 44 groups them into one or more segment groups 38. Some preferable embodiments may base such groupings on, for example, the nature of the individual segments 36 (e.g. text, tables, shapes, other objects), location within the document (e.g. segments 36 of text on a single line are grouped together, etc.), and/or mobility relative to other segments or fragments 36. Those of ordinary skill in the art will recognize the various approaches to creating the segment groups 38.

With the segment groups 38 established, the authentication marking module 44 can then create the marking sequence 16 and apply it to the digital image 14 copy, creating a unique marked copy 18 of the original digital image 14. Both the marking sequence 16 and the unique marked copy 18 are preferably stored in the database 34. In the case of a user-initiated application of the system 40 in which data about the user and the user's request was recorded and stored, the authentication marking module 44 preferably stores the marking sequence 16 and the unique marked copy 18 in association with said user data. The unique marked copy 18 is then also provided to the user who initiated the request for his or her use.

To authenticate a digital image for comparison 48, the system 40 preferably employs a comparative analysis module 46, though the steps performed by the comparative analysis module 46 could also or alternatively be performed by the authentication marking module 44. The comparative analysis module 46 first obtains the image for comparison 48. The image 48 may be obtained via user submission, using an internet scraping process, or through other electronic means, as will be understood to those of ordinary skill in the art.

The comparative analysis module 46 next preferably performs the authentication process 20. Preferable embodiments authenticate the image for comparison 48 by overlaying it with the one or more unique marked copies 18 previously created by the authentication marking module 44 and stored in the database 34. The comparative analysis module 46 may also perform the authentication process 20 using the original digital image 14 as well, where applicable. Upon identifying a unique marked copy 18 matching the image for comparison 48, preferable embodiments of the comparative analysis module 46 generate an authenticity conclusion report 50 confirming the image for comparison's 48 authenticity. If no match exists, the authenticity conclusion report 50 identifies the image for comparison 48 as an unauthorized copy.

The authenticity conclusion report 50 is preferably provided to the user in the case of a user-initiated authentication process 20 and is also preferably stored in the database 34 for later reference. The authenticity conclusion report 50 preferably includes information on the unique marked copies 18 used in the authentication process 20 and which, if any, matched the image for comparison 48. The authenticity conclusion report 50 may also reflect any other data associated with any matching unique marked copy 18, such as the user data and user request data associated with such unique marked copy 18, where applicable.

In preferable embodiments, upon identifying an unauthorized image for comparison 48, the system 40 may take further action to attempt to remove the unauthorized image 48, such as initiating a take-down request on a third-party website, taking steps to initiate legal proceedings, etc. Those of ordinary skill in the art will recognize the steps that may be automated to protect the authenticity of the digital images 14 submitted to the system 40 for protection. As will be understood by those of ordinary skill in the art, the system may be implemented locally using local installation software or implemented over a network connecting a local device with a remote server.

Figure 9:
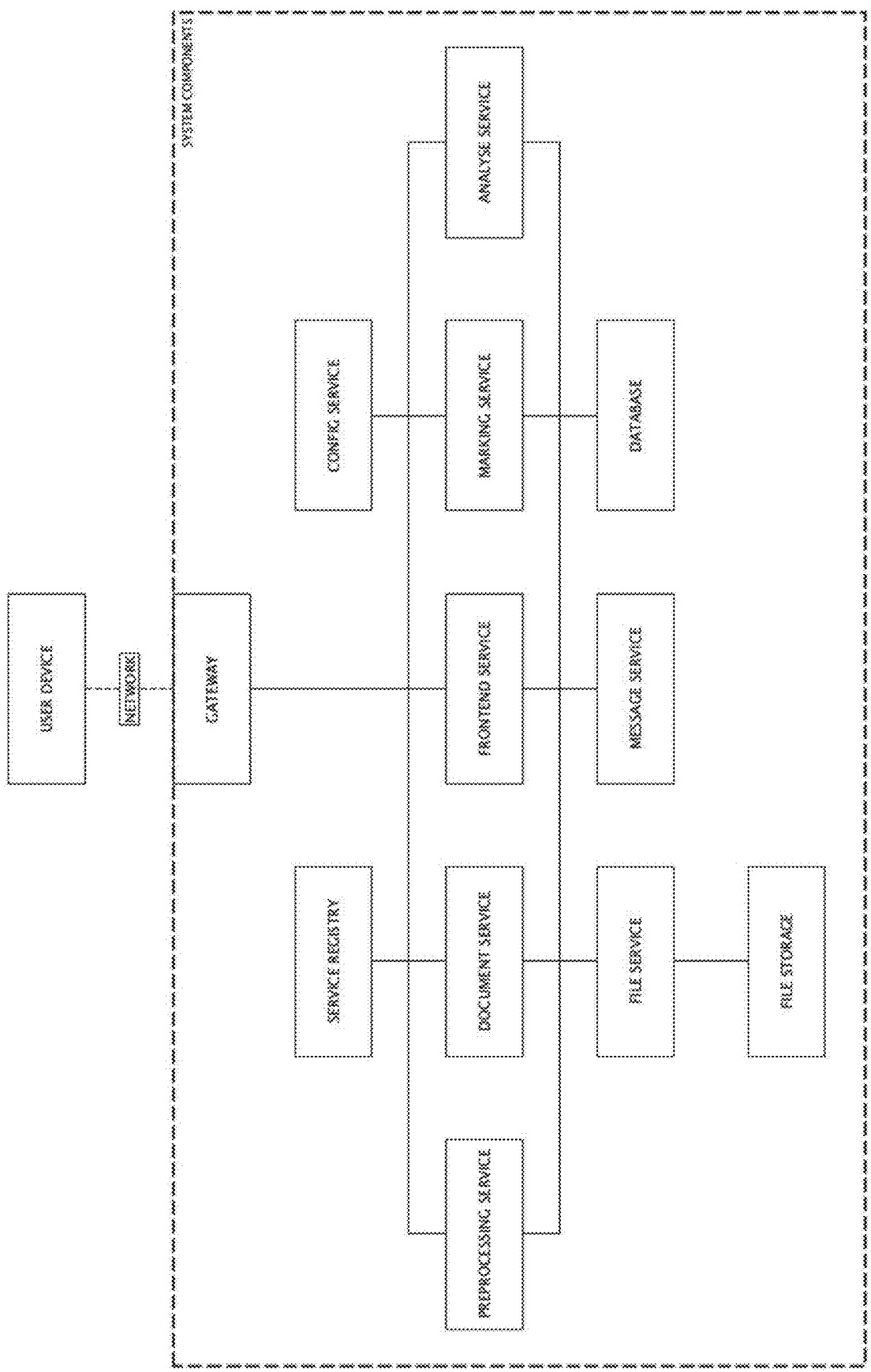
FIG. 9 is a schematic representation of a system according to the preferable embodiments of the present invention depicted in FIGS. 1-8.

Referring last to FIG. 9, a schematic representation of an exemplary system 60 according to preferable embodiments of the present invention is shown. As depicted, a user device 62 can be connected to the system 60 over a network 64, although the system may also be installed locally on the user device 62. The system 60 preferably has a gateway 66 and a front-end service 68 providing the user device 62 access to the system 60. For example, a user may access the system 60 using a web-browser through a web interface generated by the front-end service 68. The gateway 66 and/or front-end service 68 may additionally authenticate user credentials and perform other access security functions, as will be understood by those of ordinary skill in the art. For example, the gateway 66 may provide user devices 62 with secured access to the system 60 using HTTP(S) protocol and operate JSON (JavaScript Object Notation) format data.

The exemplary system 60 preferably employs a preprocessing service 70 that can identify and convert, if necessary, any information provided by the user into a digital image file. The preprocessing service 70 may also perform other document processing functions, such as OCR (optical character recognition), etc., and/or a document service 72 may perform such document processing functions. The document service 72 also preferably implements functions to manage the other services of the system and preferably manages registration and storage of information about the digital image file using a service registry 74, a file service 76, and a file storage 78. The file service 76 also preferably provides unified file storage functionality for the system 60, and the service registry 74 preferably implements "service discovery" functionality.

A marking service 80 next processes the digital image provided by the preprocessing service 70, identifying the various segments and/or segment groups found in the digital image file. The marking service 80 then marks the digital image file, as discussed above, creating the unique marked copy, and preferably stores the unique marked copy and the marking sequence in a database 82. A configuration service 84 may assist in developing the marking sequence and preferably provides configuration parameters to the other services employed by the system 60.

An analysis service 86 operates to authenticate an item submitted from the user device 62. As discussed above, the analysis service 86 preferably queries database 82 to obtain digital image data for comparison and performs the authentication process, preferably by overlaying the item submitted for authentication with the digital image data obtained from the database 82. The system's front-end service 68 preferably also provides a message service 88 permitting the system's 60 components to interact with each other in an asynchronous way and preferably also facilitates interaction with the user devices 62 connected via the network 64. Such message service 88 may, for example, provide the authenticity conclusion report created by the analysis service 86 to a user seeking an authenticity confirmation on the item submitted for authentication. As those of ordinary skill will appreciate, the components of system 60 may perform these and other functions to implement the full extent of functionality of the invented method and system.

The Special Case of Image Files

The present invention may process certain non-raster format digital documents, such as PDFs, MS Word files, MS PowerPoint files, etc., somewhat differently from the processing of raster-format digital documents in some preferable embodiments. For example, PDF files are often embedded with character recognition and object grouping functions and operators, which allow the present invention's authentication system and process to mark such files without undertaking the character recognition and object grouping steps, speeding up the authentication process substantially.

Visually, the marking of non-raster image files and raster files creates the same output. But from a resource-utilization and processing-speed perspective, the authentication process can be up to ten times faster for non-raster image files, which is highly desirable particularly when processing large amounts of data, as will be recognized by those of skill in the art.

FIG. 10 depicts an exemplary portion of a digital file, such as a PDF. As shown, the exemplary PDF file format contains groups of objects. The PDF file format is a sequential set of operators, and PDF viewers process these operators sequentially such that PDF files appear identical whatever device is used to view them. As depicted, all visual objects are grouped through CM operators (transformation matrix that sets the rules for displaying and scaling nested objects). Through the operators Q and q, the display parameters are saved and restored. The objects (expressed through a set of different operators) in the PDF are divided into groups through the operators cm, Q and q, and the movement of an entire group of objects can be accomplished by changing the parameters of the operator cm.

When outputting the text of the PDF, the framing operators BT and ET are used within which new output parameters can be set, through the operators Tm (text transformation matrix). Thus, all operators between the encountered operators Tm also form a group and can be labeled by changing the parameters of the operator Tm. Further, all the text is output through the operators Tj and TJ, which output specific text lines. Text lines represent nested groups and are preferably marked using the present invention's method by moving the drawing start point through the Td statement.

Within string values of text, there are non-printable characters (for example, the space character), as well as punctuation marks and special characters (for example, brackets, quotes, or dashes), commonly referred to as delimiters. All other characters between the separator characters are nested groups (in most cases, this is a simple word). Preferable embodiments of the present invention may move individual words in a PDF by splitting one line-output operator (Tj operator) into an array-of-string operator (TJ operator), which allows for the increase and decrease of the horizontal offset between words.

Each of these operations is used in preferable embodiments of the present invention to mark PDFs and other applicable non-raster image files. By utilizing these operators inherent in the native files, the present invention can omit the steps of the authentication process associated with rendering an image, identifying the individual elements therein, and segmenting and grouping of those individual elements. By omitting these steps and using the grouping inherently present in the non-raster image file itself, preferable embodiments of the present invention can skip directly to generating the sequence of modifications and applying those modifications to the non-raster image file at the file level, substantially improving processing speeds for large amounts of data.

Figure 12:
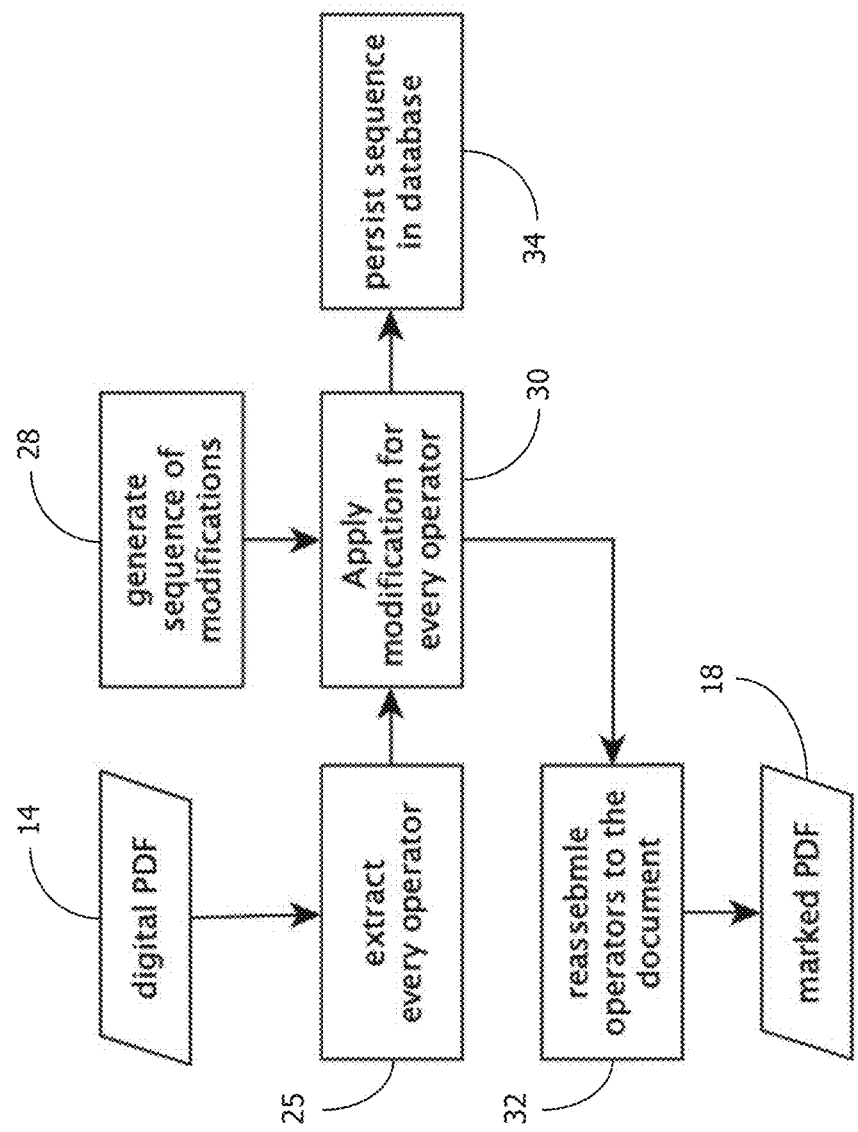
FIG. 12 is a schematic representation of a method according to the preferable embodiments of the present invention depicted in FIGS. 1-5 and 10, with the unnecessary operations for processing a non-raster image file, such as a PDF, removed.

FIG. 11 depicts an exemplary and schematic representation of a method of the present invention as applied to a non-raster image file, such as a PDF. As depicted, the shaded boxes relating to rendering the image 22, defining image segments 24, defining segment groups 26, and persisting the segments and groups in the database 34 are not required for non-raster image files. Instead, the present invention uses the groupings already present in the native PDF or other non-raster image file to define the groups and prepare the file for marking. As depicted in FIG. 12, rather than undertaking these steps, the authentication process instead receives the digital PDF or other non-raster image file 14, extracts every operator 25 to define groups for marking using the non-raster image file's 14 inherent properties and operators, generates the sequence of modifications 28 and applies those modifications for each operator 30, and reassembles the operators to the file 32, creating the marked PDF or other non-raster image file 18. The process also preferably persists the modification sequence in the database 34 for future reference.

By omitting pre-marking steps 22, 24, and 26 and replacing them with the simple step of extracting every operator 25 of the image file, and by applying the markings at the PDF level by reassembling the operators to the document 32, the present invention can drastically improve processing speeds and resource allocation, as will be understood to those of skill in the art. From a visual perspective, a document marked using the exemplary process shown in FIG. 12 will appear identical to a document marked using the exemplary process shown in FIG. 11, but the process depicted in FIG. 12, applicable only to PDFs and other non-raster image files with internal grouping operators, is upwards of ten times faster, permitting the use of the present invention continuously and repeatedly without reducing the work efficiency of devices employing the present invention's methods.

Processing time and resource efficiency is further improved by omitting the step of persisting the segments and groups in the database 34 as well. When it comes time to authenticate a marked PDF or other non-raster image file that was marked using the more streamlined method described above, the same comparison operation is employed but without the added burden of accessing and processing the segmentation and grouping steps applied and persisted in the database (22, 24, 26, 34) as is necessary for raster-format files.

Figure 13:
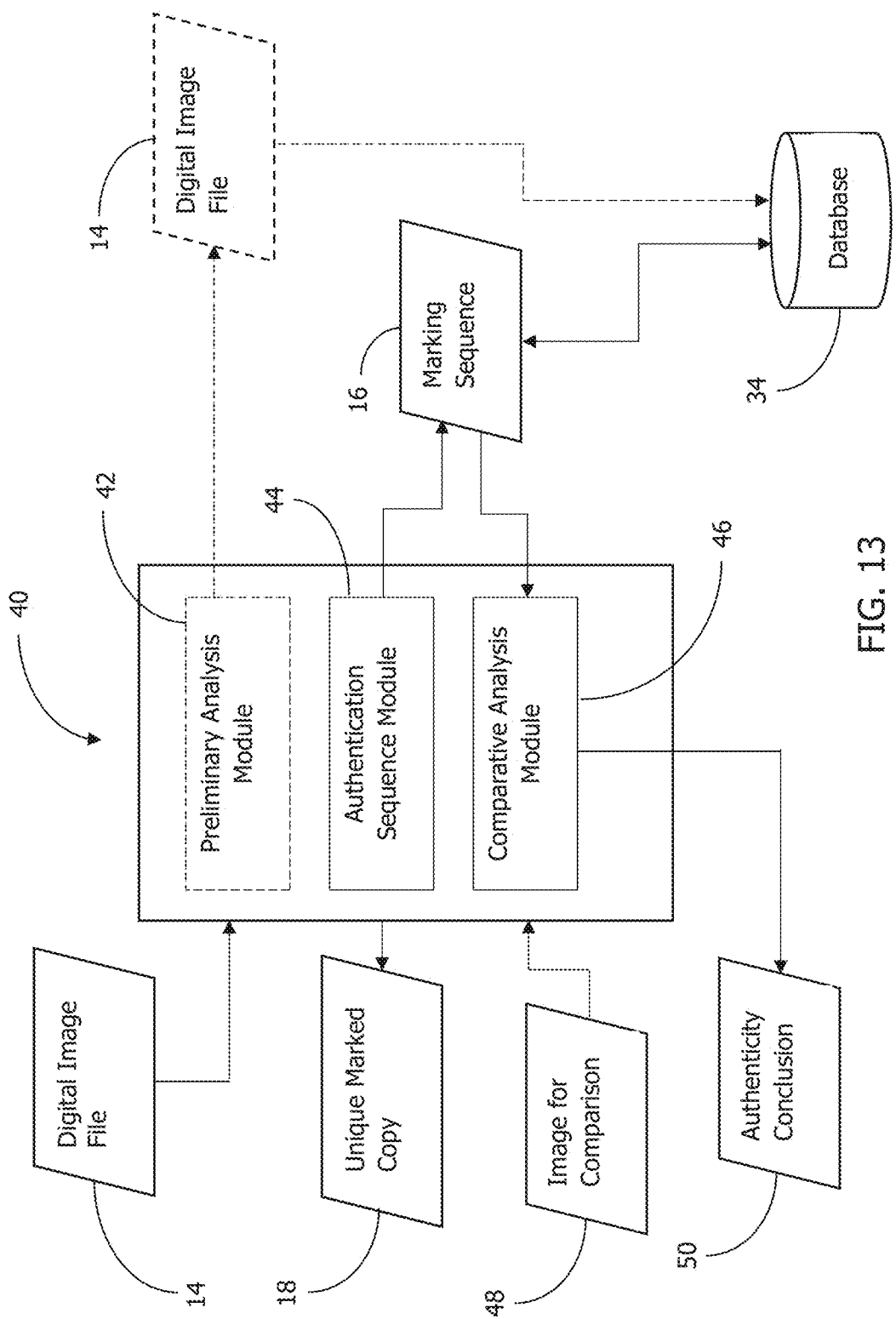
FIG. 13 is a schematic representation of a system according to preferable embodiments of the present invention depicted in FIGS. 1-12.

FIG. 13 depicts a schematic representation of an exemplary system 40 according to preferable embodiments of the present invention capable of processing PDF and other non-raster image files at speeds upwards of ten times faster that required for processing raster-format files. As depicted, the preliminary analysis module 42 may be unnecessary in some preferable embodiments when processing only PDF or other non-raster image files. System 40 preferably operates to receive the digital image file 14, and either the preliminary analysis module 42 or, in some preferable embodiments, the authentication sequence module 44 groups the objects and text using the operators from the non-raster image file. The authentication sequence module 44 then preferably generates the marking sequence 16, persists the marking sequence 16 in the database 34, and applies the marking sequence 16 to the digital image and reassembles the operators to create the marked copy 18 of the PDF or other non-raster image file.

To authenticate an image for comparison 48, the system 40 preferably employs a comparative analysis module 46 to assess the image's 48 appearance based upon the marking sequences 16 stored in the database 34, performing the authentication process 20 and generating an authenticity conclusion report 50. If the image for comparison 48 matches one of the saved marking sequences 16 from the database 34, the system 40 generates an authenticity conclusion report 50 determining that the file is authentic. If no match is found, the authenticity conclusion report 50 would identify the image for comparison 48 as an unauthorized copy. This entire process is performed far more rapidly with respect to PDF and other non-raster image files by omitting the steps needed for pre-processing raster-format files, including rendering the image 22, defining image segments 24, defining segment groups 26, and persisting the segments and groups in the database 34.

While the present invention has been described with reference to particular embodiments and arrangements of components, features, and the like, it is not limited to those embodiments or arrangements. Modifications and variations will be ascertainable to those of skill in the art, all of which are inferentially and inherently included in these teachings.

What is claimed:

1. A method for authenticating digital information comprising the steps of:
    obtaining a digital image file;
    obtaining object grouping information from one or more operators from the image file, the object grouping information defining one or more object groups;
    generating a marking sequence comprising shifting at least one of the one or more object groups in one or more directions; and
    applying the marking sequence to the digital image, creating a unique marked copy of the digital image.

2. The method of claim 1, further comprising the steps of:
    preparing the digital information for processing, such preparation comprising rendering a digital image;
    identifying segments of content in the digital image; and
    grouping the segments of content into the one or more object groups.

3. The method of claim 2, wherein the marking sequence further comprises altering a spacing between two or more of the segments in at least one of the one or more segment groups.

4. The method of claim 1, wherein at least one of the marking sequence, the unique marked copy, and the digital image file is stored in digital form in a database.

5. The method of claim 1, further comprising the steps of:
    obtaining a digital image for comparison;
    employing an authentication process to authenticate the digital image for comparison by comparing it to the unique marked copy; and
    generating an authenticity conclusion report identifying the digital image for comparison as authentic if the authentication process determines that it matches the unique marked copy and identifying it as inauthentic if it does not.

6. The method of claim 5, wherein the authentication process comprises digitally overlaying the digital image for comparison with the unique marked copy.

7. A method for authenticating a PDF comprising the steps of:
    obtaining a PDF file;
    obtaining content grouping information from one or more operators from the PDF file, the content grouping information defining one or more object groups;
    generating a marking sequence comprising shifting at least one of the one or more object groups in one or more directions; and
    applying the marking sequence to the PDF file, creating a unique marked copy of the PDF file.

8. The method of claim 7, wherein at least one of the marking sequence, the unique marked copy, and the PDF file is stored in digital form in a database.

9. The method of claim 7, further comprising the steps of:
    obtaining a digital image for comparison;
    employing an authentication process to authenticate the digital image for comparison by comparing it to the unique marked copy; and
    generating an authenticity conclusion report identifying the digital image for comparison as authentic if the authentication process determines that it matches the unique marked copy and identifying it as inauthentic if it does not.

10. The method of claim 9, wherein the authentication process comprises digitally overlaying the digital image for comparison with the unique marked copy.

11. A system for authenticating a digital file comprising:
    an authentication marking module for generating and applying a marking sequence to the digital file to create a unique marked copy;
    wherein the authentication marking module obtains content grouping information from one or more operators from the digital file, the content grouping information defining one or more object groups, and generates the marking sequence to shift at least one of the one or more object groups in one or more directions, creating the unique marked copy of the digital image.

12. The system of claim 11, further comprising a preliminary analysis module for obtaining and processing the digital file, the preliminary analysis module operating to obtain the content grouping information from the one or more operators from the digital file and to obtain two or more segments of content within at least one of the one or more object groups.

13. The system of claim 12, wherein the marking sequence also alters a spacing between the two or more of the segments of content within at least one of the one or more object groups.

14. The system of claim 11 further comprising a comparative analysis module for authenticating an image file for comparison, the comparative analysis module obtaining the image file for comparison, initiating an authentication process comprising comparing the image file for comparison with the unique marked copy, and generating an authenticity conclusion report identifying the image file for comparison as authentic if the authentication process determines that it matches the unique marked copy and identifying it as inauthentic if it does not.

15. The system of claim 14, wherein the authentication process comprises digitally overlaying the digital image for comparison with the unique marked copy.

16. The system of claim 14 further comprising at least one database, wherein at least one of the marking sequence, the unique marked copy, the digital file, the image file for comparison, and the authenticity conclusion report is stored in the at least one database.

* * * * *